Dec. 17, 1929.  H. H. BOYCE  1,740,151
INSTRUMENT BRACKET
Filed May 31, 1923
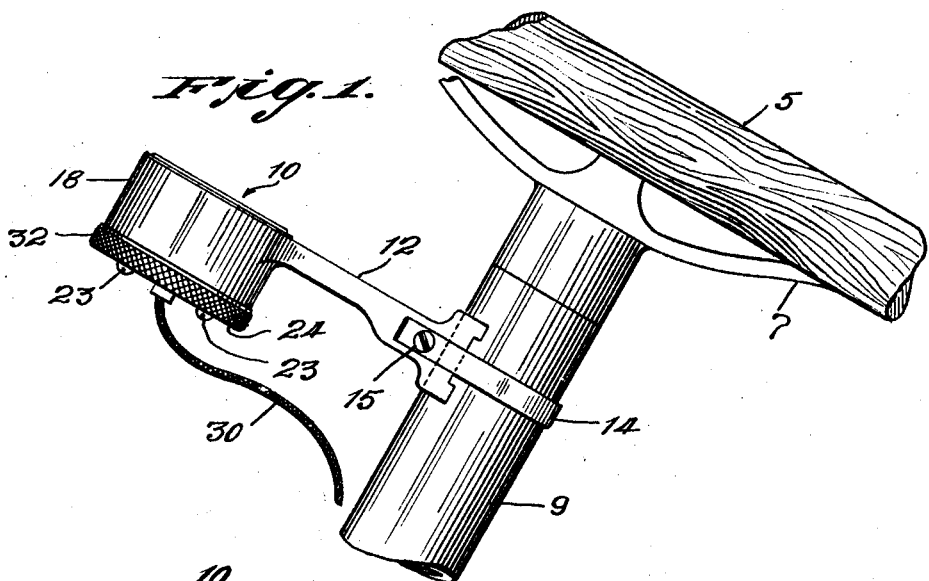
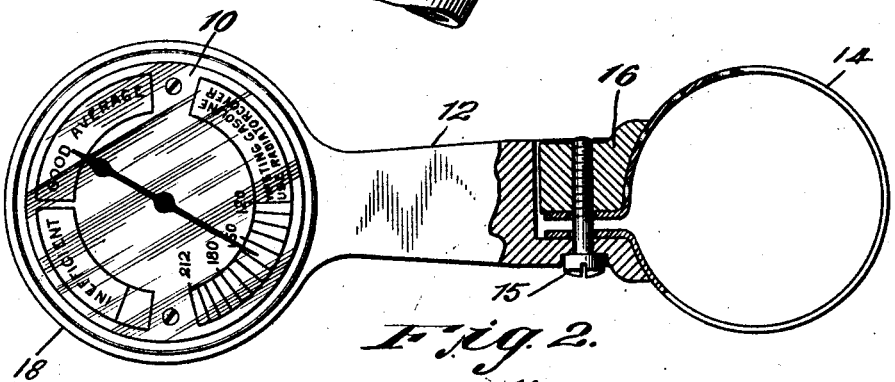
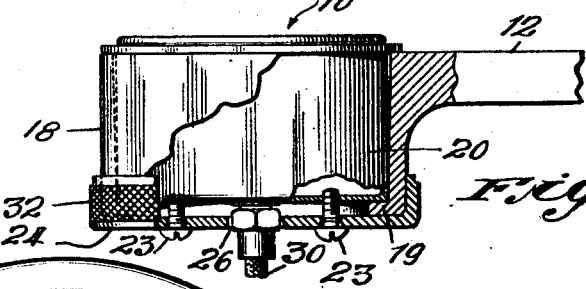
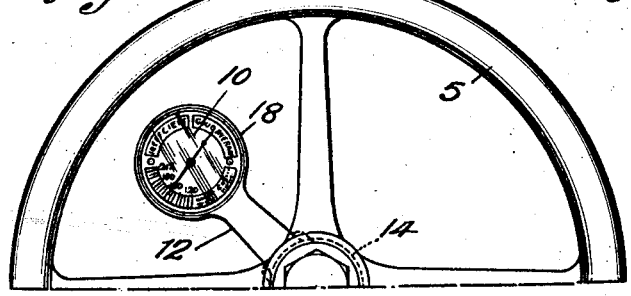
INVENTOR
Harrison H. Boyce
BY
Moses, Hammond & Holte
ATTORNEYS Patented Dec. 17, 1929

1,740,151

UNITED STATES PATENT OFFICE

HARRISON H. BOYCE, OF JERICHO, NEW YORK

INSTRUMENT BRACKET

Application filed May 31, 1923. Serial No. 642,720.

This invention relates to improvements in means for mounting instruments for indicating automobile operating conditions, and is particularly applicable for the mounting of instruments for indicating the thermal condition of the motor.

It is the object of this invention to provide means whereby an instrument, especially a motor heat indicating instrument, may be located directly under the eye of the driver where it will be clearly observable at all times, and may be adjusted to the most easily visible position; and whereby the instrument may be mounted without requiring the cutting of a hole in the instrument board or other structural change in the vehicle.

The description and drawings which form a part of this specification will serve to make plain a preferred embodiment of means for accomplishing the foregoing object together with such other objects as will appear as the description proceeds.

Referring to the drawings:

Fig. 1 is an elevation of one embodiment of my invention as attached to a portion of the automobile.

Fig. 2 is a plan view in partial section of the embodiment shown in Fig. 1.

Fig. 3 is a view, partly in section, showing the mounting of the instrument in the bracket.

Fig. 4 is a view showing how the instrument will appear to the driver.

In Fig. 1 the numeral 5 indicates an automobile steering wheel having the spokes 7 and mounted upon the steering column, or post 9. 10 is an instrument and 12 is a bracket by which it is supported upon the steering column.

The bracket 12 is provided with clamping band 14 which may be adjusted to any desired tension by means of screw 15 and adjustable block 16, thus providing for ready attachment and adjustment of this bracket upon the steering post 9. It should be understood however, that the band 14 and the screw and block are not indispensable to my invention and that any other clamping means of a readily adjustable nature, several of which are known to the art, may be equally well employed. By adjusting the screw 15, the band 14 may be loosened upon the post 9 so that the bracket 12 may be moved vertically upon the post 9 to permit the automobile driver to bring the instrument to that height which will be most suitable to his individual range and focus of vision. Radial movement about the post 9 is also possible and the bracket 12 may be swung as desired so as to bring the instrument into a position where it may be most clearly viewed with the least interference from the steering spokes 7. In some cases this may be with the bracket extending directly away from the driver, while in other instances the best results may be obtained by adjusting the bracket more or less to one side or the other. When the bracket has been properly adjusted the screw 15 is tightened and the bracket then held firmly in position.

The outer, or instrument engaging end, of the bracket 12 is preferably formed as a ring 18 having a slightly larger internal diameter than the external diameter of the case 20 of the instrument 10, and provided at its lower end with an internal flange 19. The case 20 is provided with threaded openings in its bottom, or back, for the screws 23, the heads of which engage a cap 24. The cap 24 is of such form as to engage the bottom and a portion of the exterior surface of the ring 18 of the bracket 12. A central opening 25 permits of the passage of a wire or tube 30 through which indications are transmitted to the instrument 10 from the automobile mechanism. To mount the instrument 10 the wire 30 is first threaded through the ring 18 and the cap 24, the instrument case 20 is then placed in the ring 18 with its bottom against the flange 19, the cap 24 is then slipped over the bottom of the ring and the screws 23 put in. Preferably the outer surface 32 of the cap 24 is knurled to afford a ready hand grip, and by grasping this surface 32 the instrument 10 may be turned in the ring 18 as desired, the tension of such turning adjustment being determined by the tension of screws 23, and being sufficient to prevent movement of the instrument due to vibration.

The adjustability of the instrument 10 in the ring 18 is important as it permits the dial of the instrument to be correctly oriented irrespective of the radial adjustment of the bracket 12 upon the steering column. Thus, if it is found most convenient to mount the bracket 12 in an oblique position as shown, for instance, in Fig. 4, the instrument can be turned in the ring so as to bring the center of the dial to the top or normal position. Thus the instrument dial will occupy the same position relative to the eye of the operator and will present the same appearance no matter what position the bracket may be adjusted to. This is especially desirable for an indicating instrument such as a motor heat indicator where the general position of the pointer with reference to the scale is the thing to be observed rather than an exact reading in degrees. The operator becomes accustomed to noting the normal position of the indicating hand so that any marked deviation therefrom will become apparent, and in order that this result may be certainly accomplished, it is necessary that the instrument should always be mounted in the same normal position, thereby avoiding the possibility of a misleading appearance or indication being presented.

It will be evident that many changes in the mechanical elements employed may be made without departing from the spirit of my invention and it will be seen that means have been provided for the mounting of an indicating instrument in a readily observable position, and in such manner that the instrument may be adjusted to the individual desires of the automobile driver, to the individual characteristics of a particular vehicle or vehicle body, and to the best arrangement for a given instrument dial.

When in the specification and claims an automobile is referred to, it will be understood that any motor propelled vehicle is included, such for instance as a motor car, truck, tractor, airplane or motor boat.

What I claim is:

1. Means for mounting a temperature indicating instrument upon an automobile or the like comprising a bracket having an adjustable clamp at one end adapted to engage the automobile steering column and having a ring at the other end adapted to receive an indicating instrument, a cap engaging said ring and means for securing said cap to said instrument and drawing the instrument into frictional engagement with the ring.

2. In combination, an instrument bracket having one end formed with a broad cylindrical face for engaging the steering column of an automobile, and having a recess adjacent said face, a clamping block in said recess also provided with a broad cylindrical face for engaging the steering column, a flexible band having its ends received between the bracket and the clamping block, and its body portion looped to embrace the steering column, a screw passed through the bracket and the strap ends and threaded into the clamping block for tensioning the band upon the steering column, an instrument socket in the opposite end of the bracket, and means for clamping an instrument firmly in the socket whereby the instrument is guarded against vibration.

Signed at New York, N. Y., this 24th day of May, 1923.

HARRISON H. BOYCE.